(12) United States Patent
Devi et al.

(10) Patent No.: US 10,307,734 B2
(45) Date of Patent: Jun. 4, 2019

(54) WATER SPLITTING ACTIVITY OF LAYERED OXIDES

(71) Applicant: COUNCIL OF SCIENTIFIC AND INDUSTRIAL RESEARCH, New Delhi (IN)

(72) Inventors: Nandini Devi, Maharashtra (IN); Soumya Bharathi Narendranath, Maharashtra (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 430 days.

(21) Appl. No.: 14/915,557

(22) PCT Filed: Sep. 1, 2014

(86) PCT No.: PCT/IN2014/000560
§ 371 (c)(1),
(2) Date: Feb. 29, 2016

(87) PCT Pub. No.: WO2015/029071
PCT Pub. Date: Mar. 5, 2015

(65) Prior Publication Data
US 2016/0214084 A1  Jul. 28, 2016

(30) Foreign Application Priority Data
Aug. 30, 2013 (IN) ............. 2565/DEL/2013

(51) Int. Cl.
*C01B 3/04* (2006.01)
*B01J 23/08* (2006.01)
(Continued)

(52) U.S. Cl.
CPC ............ *B01J 23/08* (2013.01); *B01J 23/825* (2013.01); *B01J 35/004* (2013.01);
(Continued)

(58) Field of Classification Search
CPC ........ B01J 23/08; B01J 23/825; B01J 37/082; B01J 37/08; B01J 35/0033; B01J 35/004;
(Continued)

(56) References Cited

U.S. PATENT DOCUMENTS 5,530,267 A * 6/1996 Brandle, Jr. ........ H01L 31/1852
257/76
2005/0069464 A1 * 3/2005 Obee ................. B01D 53/8668
422/186.3
(Continued)

FOREIGN PATENT DOCUMENTS

| EP | 1 172 858 A1 | 1/2002 |
| EP | 2 543 438 A1 | 1/2013 |
| WO | WO 2007/052512 A1 | 5/2007 |

OTHER PUBLICATIONS

Kudo et al, "New In2O3(ZnO)m Photocatalysts with Laminal Structure for Visible Light-induced H2 or O2 Evolution from Aqueous Solutions Containing Sacrifical Reagents," Chemistry Letters 1998 p. 1027 (Year: 1998).*

(Continued)

*Primary Examiner* — Nicholas A Smith
*Assistant Examiner* — Colleen M Raphael
(74) *Attorney, Agent, or Firm* — Patterson Thuente Pedersen PA (57) ABSTRACT

An efficient and economical process for $H_2$ evolution by water splitting, catalyzed by layered oxides that function in UV and visible light.

14 Claims, 8 Drawing Sheets

(51) Int. Cl.
*B01J 35/00* (2006.01)
*B01J 37/00* (2006.01)
*B01J 37/02* (2006.01)
*B01J 37/08* (2006.01)
*B01J 23/825* (2006.01)

(52) U.S. Cl.
CPC ....... *B01J 35/0033* (2013.01); *B01J 37/0036* (2013.01); *B01J 37/0201* (2013.01); *B01J 37/08* (2013.01); *B01J 37/082* (2013.01); *C01B 3/042* (2013.01); *B01J 2523/00* (2013.01); *Y02E 60/364* (2013.01)

(58) Field of Classification Search
CPC B01J 37/0036; B01J 37/0201; B01J 2523/00; C01B 3/042; Y02E 60/364
See application file for complete search history.

(56) References Cited

U.S. PATENT DOCUMENTS

2010/0307590 A1 12/2010 Yamazaki et al.
2014/0374270 A1* 12/2014 Minegishi ............... C01B 3/042
205/340

OTHER PUBLICATIONS

PCT International Search Report and Written Opinion for PCT/IN2014/000560, dated Jan. 30, 2015, 11 pgs.
PCT International Preliminary Report on Patentability for PCT/IN2014/000560, dated Jan. 27, 2016, 8 pgs.
Kamata K et al: "Synthesis and photocatalytic activity of gallium-zinc-indium mixed oxynitride for hydrogen and oxygen evolution under visible light". Chemical Physics Letters, Elsevier BV, NL, vol. 470, No. 1-3, Feb. 24, 2009 (Feb. 24, 2009), pp. 90-94, XP025952721. ISSN: 0009-2614. DOI: 10.1016/J.CPLETT.2009.01.012 [retrieved on Jan. 13, 2009].
Kimizuka N et al: "Homologous commpounds, $InFeO_3(ZnO)_m$ (m=1-9)", Journal of Solid State Chemistry, Orlando, FL, US, vol. 74, No. 1, May 1, 1988 (May 1, 1988), pp. 98-109, XP002112270, ISSN: 0022-4596.
Isabelle Keller et al: "Synthesis and Crystal Structures of $InGaO_3$ $(ZnO)_m$ ( m=2 and 3)". Zeitschrift F࿽R Anorganische Und Allgemeine Chemie, vol. 635, No. 12, Oct. 1, 2009 (Oct. 1, 2009), pp. 2065-2071, XP055161185, ISSN: 0044-2313, DOI: 10.1002/zaac.200900199.
Isabelle Keller et al: "The Crystal Structure of $InGaO_3(ZnO)_4$: A Single Crystal X-ray and Electron Diffraction Study", Zeitschrift F࿽ R Anorganische Und Allgemeine Chemie, vol. 636, No. 6, May 8, 2010 (May 8, 2010), pp. 1045-1049, XP055161187, ISSN: 0044-2313, DOI: 10.1002/zaac.200900586.

* cited by examiner

CSIR, INDIA

WATER SPLITTING ACTIVITY OF LAYERED OXIDES

RELATED APPLICATIONS

The present application is a National Phase entry of PCT Application No. PCT/IN2014/000560, filed Sep. 1, 2014, which claims priority from IN Patent Application No. 2565/DEL/2013, filed Aug. 30, 2013, each of which is hereby fully incorporated herein by reference.

FIELD OF THE INVENTION

The present invention relates to an efficient and economical process for $H_2$ evolution by water splitting, catalyzed by layered oxides that function in UV and visible light. Particularly, the present invention discloses catalysts that efficiently evolve $H_2$ in the presence and absence of a co-catalyst.

BACKGROUND AND PRIOR ART OF THE INVENTION

Photo-catalytic hydrogen generation from water is one of the most favorable ways to generate clean energy. Water splitting using semiconductor powder catalysts is a promising and preferred process because of the simplicity and ease of handling.

Semiconductor oxides like $TiO_2$ and ZnO are widely used in photocatalysis due to unique electronic structures facilitating the formation of electron-hole pairs, on irradiation with light of appropriate energy, which can be utilized in electron transfer processes. However, efficient utilization of these charge carriers is possible only if charge recombination is avoided.

Recombination occurs when photo generated electrons reoccupy the valence band and depends on the positions of valence and conduction bands, or electron and hole conduction pathways within the oxide lattice. On irradiation with light of appropriate energy, electrons and holes are generated in bulk of the semiconductor particles and travel to the surface, eventually being utilized in water reduction and oxidation reactions respectively, on catalytically active surface sites or external co-catalysts deployed on the surface. During these processes, there are several possible pathways for recombination of the electron hole pair leading to energy wastage, such as grain boundaries, lattice defects and surface sites.

Recombination can be prevented if photo generated electrons and holes are well separated from each other spatially, i.e. photogeneration and utilization sites as well as conduction pathways are physically separated in space within the structure of the semiconductor. Consequently, catalytic activity, which depends on the availability of the photogenerated electrons, can be enhanced if such a spatial separation is provided.

Another important parameter depends on the structural characteristics of valence and conduction bands, wherein holes and photogenerated electrons and holes are located respectively and in semiconductors with bulk 3D structures, they are structurally close to each other enhancing the chances of recombination. Hence, structures with inherent separation of photogenerated charges spatially, are ideal for efficient photocatalysis. Such a phenomenon is exploited by nature in utilizing solar energy whereby photogenerated charges are separated spatially by cascade processes. Solid oxide structures can be envisaged which have intrinsic structural anisotropy leading to separate sites for charge generation and electron conduction pathways, effectively separating holes and electrons.

In view of the aforesaid, a suitable photocatalytic material should possess a sufficiently small band gap for utilizing more abundant visible light region in the solar spectrum. The valence band and conduction band positions with respect to reduction and oxidation potentials of water should be appropriate to drive overall water splitting.

Lately, a lot of attention has been garnered by layered semiconductor oxides, like $K_4Nb_6O_{17}$, members of Ruddlesden-Popper series of perovskites, layered perovskites, $Sr_2Ta_2O_7$ and $Sr_2Nb_2O_7$ as catalysts for $H_2$ generation. Typically, these structures consist of sheets of transition metal oxides separated by alkali or alkaline earth metal ions, giving rise to anisotropy to a certain extent restricting movement of charges through interlayer spaces. However, in these layered compounds, the attempt is to introduce catalytic sites within the interlayer spaces thereby achieving partial space separation of the charges or spatially separate $H_2$ and $O_2$ evolution sites reducing the backward reaction. Moreover, high band gap energies of these compounds limit their usage to only the UV light region.

Layered structures with well-defined conduction pathways separated from photo generation sites can be envisaged to address the problems posed by layered oxides effectively. $InMO_3(ZnO)_m$ are a series of oxides form one such family of compounds which are conventionally studied for their excellent thermoelectric properties as well as transparent conducting oxides. The enhanced conductivity is suggested to be due to a spatial separation of the carrier donors located in insulating layers and the conducting layers which transfer the carriers effectively. Spatial separation in $InMO_3(ZnO)_m$ is found to be much higher compared to contemporary semiconductors. This is manifested in the anisotropic nature of the electrical conductivity. Measurements on thin film and single crystals reveal higher conductivity along a-b plane. Kawazoe and co-workers (Un'no, N. Hikuma, T. Omata, N. Ueda, T. Hashimoto, and H. Kawazoe, *Jpn. J. Appl. Phys., Part 2* 32, L1260 (1993), T. Omata, N. Ueda, K. Ueda, and H. Kawazoe, *Appl. Phys. Lett.* 64, 1077 (1994), K. Yanagawa, Y. Ohki, T. Omata, H. Hosono, N. Ueda, and H. Kawazoe, *Appl. Phys. Lett.* 64, 2071 (1994)) suggested that layers formed by edge sharing $MO_6$ octahedra, where M is a p-block metal ion, may act as electron conducting pathways facilitating electrical conductivity. The unique electronic and band structure resulting from such a structural anisotropy makes this series, potential materials for addressing recombination issues associated with semiconductor photocatalysts.

In this context, there remains a need in the art for a simple and economical photocatalytic water splitting process catalyzed by structurally anisotropic compounds with photogeneration sites and electron conduction pathways which are spatially separated structurally.

Therefore, it will be of advantage to explore photo catalysts that have the above mentioned properties and structures and provide them as efficient photo catalysts for systems to evolve $H_2$ by water splitting. But such catalysts should preferably satisfy the need to maintain the costs of the process of $H_2$ generation. Rather it would be pertinent to state here that the catalyst should not be the reason for the process to not satisfy the need for an economic alternative. It would be further advantageous to provide a catalyst that functions well at the visible and the UV range.

OBJECTS OF THE INVENTION

An object of the present invention is to provide a photocatalytic process for $H_2$ evolution by water splitting using a catalyst active in UV and visible light.

Another object of the present invention is to provide a process of $H_2$ evolution by water splitting using a catalyst that is independent of a co catalyst.

SUMMARY OF THE INVENTION

Accordingly, embodiments of the present invention provide a photocatalytic water splitting process for $H_2$ generation catalyzed by $InA(ZnO)m$ in the visible and UV light range, wherein A is selected from an oxide of Fe or Ga and m=1-5, comprising:
  i. dispersing $InA(ZnO)m$ powder in a reactant solution comprising water and methanol in ratio of 4:1 in a gas closed irradiation system;
  ii. irradiating the reactant mixture as obtained in step (i) to obtain hydrogen.

In an embodiment of the present invention, the catalyst are selected from the group consisting of $InFeO_3(ZnO)m$ and $InGaO_3(ZnO)m$, wherein m=1-5.

In another embodiment of the present invention, the irradiation process is carried out in the UV or visible light region.

In yet another embodiment of the present invention, the said process is carried for a period of 1-12 hours.

In yet another embodiment of the present invention, optionally the process is carried out in the presence of a metal co-catalyst selected from the group consisting of NiO, CuO and Pt.

In yet another embodiment of the present invention, NiO is loaded onto $InGaO_3(ZnO)m$, where m=1-5.

In yet another embodiment of the present invention, CuO is loaded onto $InGaO_3(ZnO)m$, where m=1-5.

In yet another embodiment of the present invention, Pt is loaded onto $InFeO_3(ZnO)m$, where m=1-5.

In yet another embodiment of the present invention, the hydrogen evolution rate is in the range of 7 to 11 milli mol/g/h and 0.8 to 3.58 milli mol/g/h in the presence of catalyst $InFeO_3(ZnO)m$ and $InGaO_3(ZnO)m$ respectively.

In yet another embodiment, the present invention provides a photocatalyst composition $InA(ZnO)_m$, wherein A is selected from an oxide of Fe or Ga and m=1-5 for use as a catalyst in water splitting reactions for $H_2$ generation.

DETAILED DESCRIPTION

Embodiments of the invention provide an efficient and economic process for $H_2$ evolution by water splitting employing layered oxides as photo catalysts, which are functional in UV and visible light.

In an aspect, embodiments of the present invention provide a process for $H_2$ evolution, wherein the photocatalyst is $InA(ZnO)_m$, wherein m=1-5, A is selected from an oxide of Fe or Ga, such that the catalyst evolves $H_2$ in UV as well as visible range.

In another aspect the present invention provides a process of evolution of $H_2$ carried out optionally in the presence of a co-catalyst selected from Pt, CuO or NiO.

"UV" and "visible light range" as used in the specification refer to wavelengths in the range of 180-800 nm.

Accordingly, embodiments of the present invention disclose a photocatalytic water splitting process for $H_2$ generation catalyzed by $InA(ZnO)_m$, wherein A is selected from an oxide of Fe or Ga and m=1-5 in the absence of a metal co-catalyst and is carried out in the UV or visible range.

Embodiments of the present invention disclose a photocatalytic process for $H_2$ generation in the presence of a catalyst $InA(ZnO)m$, wherein A is selected from an oxide of Fe or Ga and m=1-5.

Further, embodiments of the present invention disclose a photocatalytic process for H2 generation in the presence of a layered oxide catalyst $InA(ZnO)m$, wherein A is selected from an oxide of Fe or Ga and m=1-5 comprising:
  a. dispersing $InA(ZnO)m$ powder in a reactant solution comprising water and methanol in a ratio of 4:1 in a gas closed irradiation system, and
  b. irradiating the reactant mixture obtained in step a.

Accordingly, the photocatalytic activity of $InA(ZnO)m$ is determined by measuring the $H_2$ evolution in reactions that are carried out in a gas-closed system having a dead volume in the range of 45-55 ml.

The instant photocatalyst $InA(ZnO)m$, wherein A is selected from an oxide of Fe or Ga and m=1-4 is dispersed by magnetic stirring in the reactant solution (25 mL) in an irradiation cell made of quartz.

The reactant solution for water splitting comprises (20 mL) pure/distilled water and (5 mL) methanol in a ratio of 4:1.

The reactant mixture is irradiated and methanol as the sacrificial reagent is oxidized by the resulting photogenerated holes.

Embodiments of the present invention disclose a water splitting catalyst for $H_2$ generation selected from the group consisting of $InFeO_3(ZnO)m$ and $InGaO_3(ZnO)m$, where m=1-5.

Embodiments of the present invention disclose a photocatalytic water splitting process for $H_2$ evolution, wherein the catalysis is carried out in the UV range and visible range of light.

The light source used for irradiation in the closed system is a 400 W mercury lamp for UV irradiation and a 400 W Tungsten lamp for visible irradiation.

Embodiments of the present invention disclose a photocatalytic process in the presence of a catalyst having formula $InA(ZnO)m$, wherein the process is carried for a period of 1 to 8 hours.

The evolving gas mixture from the closed system is taken in a syringe at an interval of 1 hour. The amount of $H_2$ evolved can be determined using gas chromatography (Agilent GC with Carbosphere column and $N_2$ as carrier gas).

Embodiments of the present invention disclose a photocatalyst, $InA(ZnO)_m$, wherein A is selected from an oxide of Fe or Ga and m=1-5 for catalyzing water splitting reactions for H2 generation.

The instant catalyst $InA(ZnO)m$, is prepared by grinding indium oxide ($In_2O_3$), a metal oxide selected from $FeO_3$ or $GaO_3Fe_2O_3$; and ZnO under acetone in an agate mortar and pestle and subjecting it to calcination at 700° C., 900° C. and 1000° C. overnight with intermitted grinding in a muffle furnace. The resulting powder is pelleted by adding 2.5% polyvinyl alcohol in an aqueous solution as a binder. The pellet is sintered two times at 1350° C. for 15 h. The catalyst is characterized by XRD. Pt is loaded onto $InFeO_3(ZnO)m$, where m=1-5, by a wet impregnation method and heated at 400° C. for 1 hour. Metal oxides selected from NiO and CuO are used as co-catalysts for water splitting reactions catalyzed by $InGaO_3(ZnO)m$, where m=1-5.

Embodiments of the present invention disclose a process for catalyzing $H_2$ generation wherein the process is optionally co-catalysed by metals or metal oxides selected from the group consisting of, but not limited to Pt, CuO or NiO.

Embodiments of the present invention disclose a photocatalytic water splitting process, wherein the hydrogen evolution rate is in the range of 7 to 11 milli mol/g/h in the presence of catalyst $InFeO_3(ZnO)m$. The hydrogen evolution rate is in the range of 0.8 to 3.58 milli mol/g/h in the presence of catalyst $InGaO_3(ZnO)m$.

Embodiments of the present invention disclose the use of the instant photocatalyst composition $InA(ZnO)m$, wherein A is selected from metal oxides of Ga or Fe and m=1-5 for catalyzing a water splitting reaction for the evolution of $H_2$.

EXAMPLES

The following examples are given by way of illustration and therefore should not be construed to limit the scope of the invention.

Example 1 i. Synthesis of $InFeO_3(ZnO)_1$

For 1 g of $InFeO_3(ZnO)_1$, 0.4627 g, 0.2661 g and 0.2712 g of $In_2O_3$, $Fe_2O_3$ and ZnO were weighed respectively and ground thoroughly under acetone in an agate mortar and pestle. The mixed powders were transferred to a platinum crucible and calcined at 700° C., 900° C. and 1000° C. overnight with intermitted grinding in a muffle furnace. The resulting powder was made into pellet by adding 2.5% polyvinyl alcohol in aqueous solution as a binder. The pellet was sintered two times at 1350° C. for 15 h.

ii. Characterization of $InFeO_3(ZnO)_1$

X Ray Diffraction

The phase formation was confirmed with XRD. Powder X-ray diffraction (XRD) was carried out in a PANalytical X'pert Pro dual goniometer diffractometer working under 40 kV and 30 mA. The radiation used was Cu Kα (1.5418 Å) with a Ni filter and the data collection was carried out using a flat holder in Bragg-Brentano geometry with 1° slit at the source and receiving sides. An X'celerator solid-state detector with a scan speed of 0.012° min$^{-1}$ was employed.

The powder XRD patterns depicted in FIGS. 1, 3, 8 and 10, show highly crystalline diffraction peaks, clearly indicating the formation of required structures, JCPDS Card Numbers 40-0250, 40-0243, 40-024, 40-0245 for IFZ1, IFZ2, IFZ3 and IFZ4 respectively, with reference to Kimizuka, N et al., *Solid State Chem.* 1988, 74, 98-109.

Figure 1:
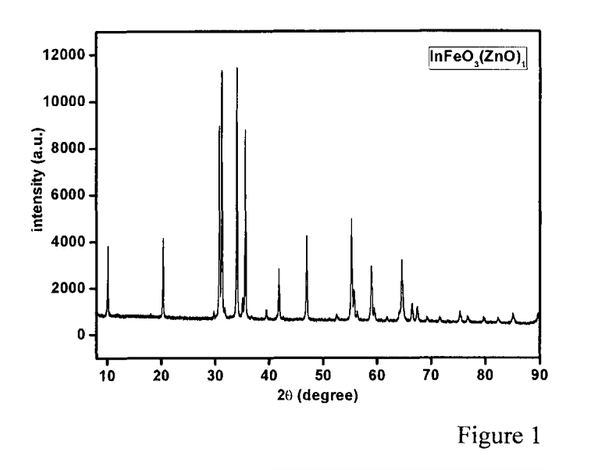
FIG. 1 depicts the powder XRD pattern of $InFeO_3(ZnO)_1$.
Figure 2:
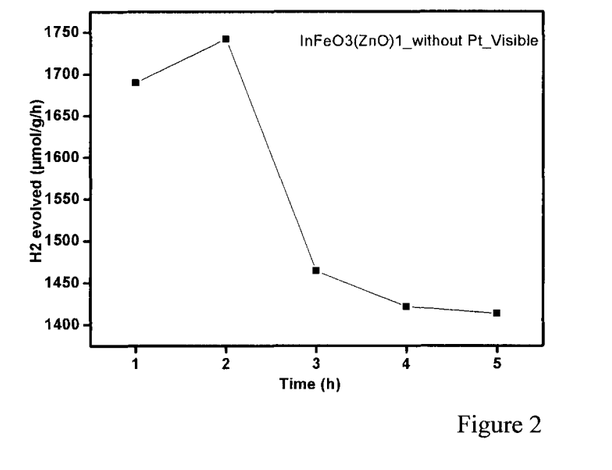
FIG. 2 depicts the effect of irradiation time on hydrogen generation by $InFeO_3$ $(ZnO)_1$ without loading Pt under visible light irradiation.
Figure 3:
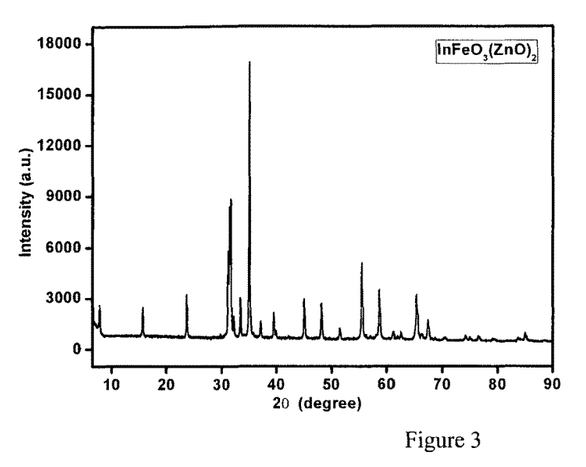
FIG. 3 depicts the powder XRD pattern of $InFeO_3(ZnO)_2$.
Figure 4:
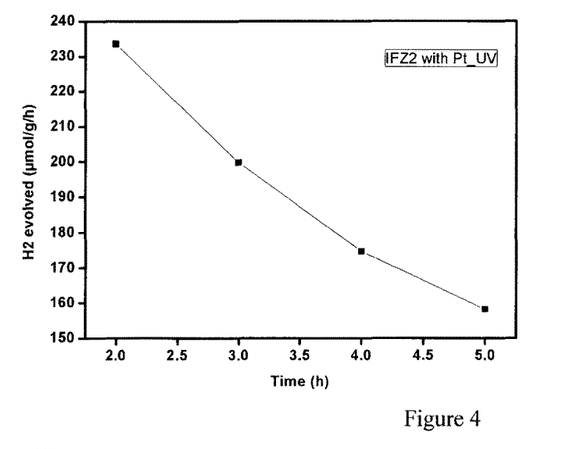
FIG. 4 depicts the effect of irradiation time on hydrogen generation by $InFeO_3$ $(ZnO)_2$ with Pt loading under UV irradiation.
Figure 5:
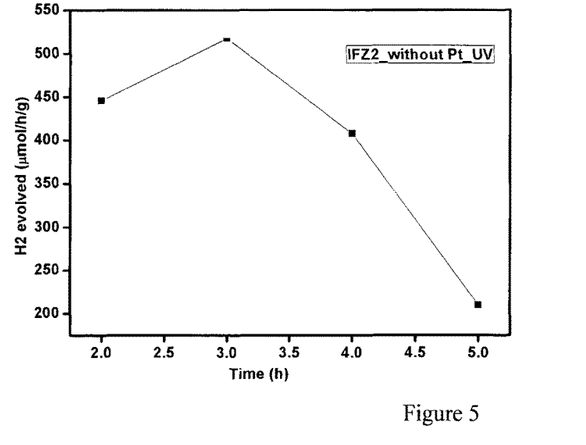
FIG. 5 depicts the effect of irradiation time on hydrogen generation by $InFeO_3$ $(ZnO)_2$ without loading Pt under UV irradiation.
Figure 6:
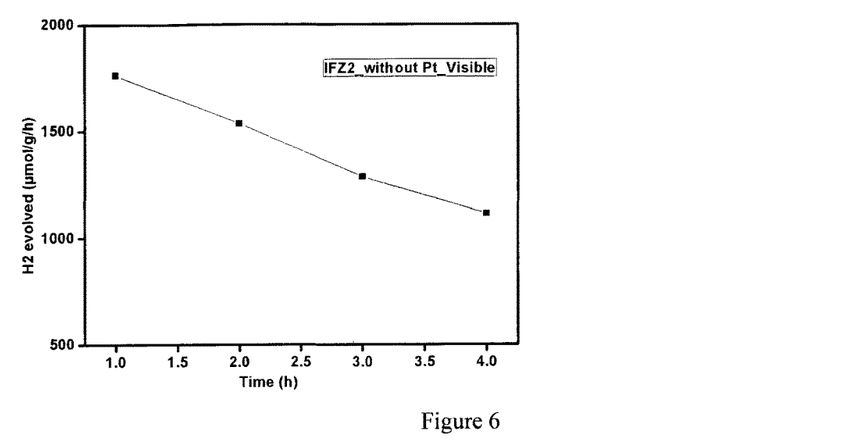
FIG. 6 depicts the effect of irradiation time on hydrogen generation by $InFeO_3$ $(ZnO)_2$ without loading Pt under visible irradiation.
Figure 7:
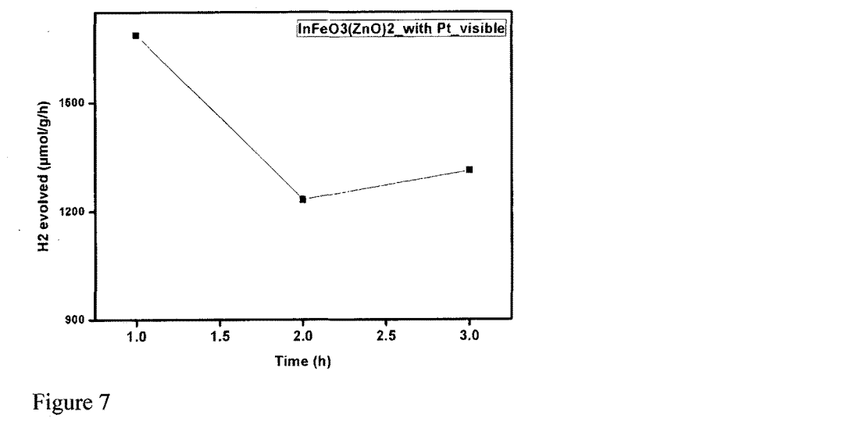
FIG. 7 depicts the effect of irradiation time on hydrogen generation by $InFeO_3$ $(ZnO)_2$ with Pt loading under visible irradiation.
Figure 8:
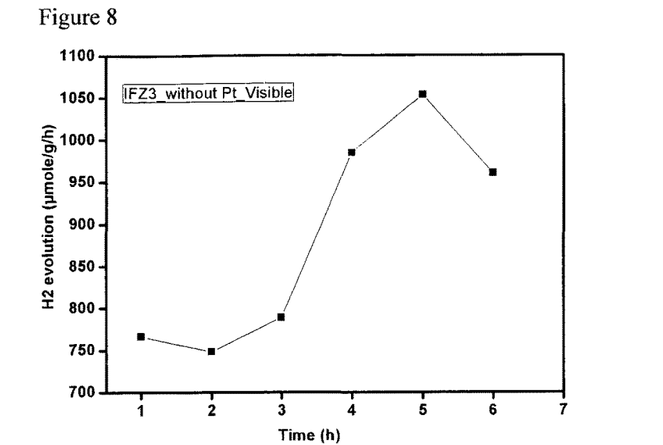
FIG. 8 depicts the powder XRD pattern of $InFeO_3(ZnO)_3$.

The XRD pattern (FIG. 1) matches that of the reported compound corresponding to JCPDS PDF number 40-0250.

iii. Photocatalytic Activity $InFeO_3(ZnO)_1$ was dispersed in 20 ml water and 5 ml methanol by means of a magnetic stirrer in a gas closed irradiation cell made of quartz having 70 ml capacity. Here methanol was taken as a sacrificial reagent which gets oxidized by the resulting photogenerated holes. The light source was a 400 Watt tungsten lamp for visible irradiation. The amount of $H_2$ evolved was determined using gas chromatography (Agilent GC with Carbosphere column and $N_2$ as carrier gas). The reaction was carried out for 5 hours. The evolving gas mixture was taken in a syringe at an interval of 1 hour and injected into the GC. With reference to Table 1 and FIG. 2, $H_2$ evolution is observed to be greater than 1 milli mole for five hours, in the absence of a co catalyst selected from Pt or NiO.

TABLE 1

Water splitting activity of $InFeO_3(ZnO)_1$

| Catalyst | Irradiation | Irradiation Time (h) | $H_2$ evolved (μmol/g/h) |
|---|---|---|---|
| $InFeO_3(ZnO)_1$_without Pt | Visible | 1 | 1689.437 |
| | | 2 | 1741.901 |
| | | 3 | 1463.899 |
| | | 4 | 1421.402 |
| | | 5 | 1413.016 |

Example 2 i. Synthesis of $InFeO_3(ZnO)_2$

For 1 g of $InFeO_3(ZnO)_2$, 0.3639 g, 0.2093 g and 0.4267 g of $In_2O_3$, $Fe_2O_3$ and ZnO were weighed respectively and ground thoroughly under acetone in an agate mortar and pestle. The mixed powders were transferred to a platinum crucible and calcined at 700° C., 900° C. and 1000° C. overnight with intermitted grinding in a muffle furnace. The resulting powder was made into pellet by adding 2.5% polyvinyl alcohol in aqueous solution as binder. The pellet was sintered two times at 1350° C. for 15 h.

ii. Characterization of $InFeO_3(ZnO)_2$

X Ray Diffraction

The phase formation was confirmed with XRD. Powder X-ray diffraction (XRD) was carried out in a PANalytical X'pert Pro dual goniometer diffractometer working under 40 kV and 30 mA. The radiation used was Cu Kα (1.5418 Å) with a Ni filter and the data collection was carried out using a flat holder in Bragg-Brentano geometry with 1° slit at the source and receiving sides. An X'celerator solid-state detector with a scan speed of $0.012°$ $min^{-1}$ was employed. The XRD pattern (FIG. 3) matches that of the reported compound corresponding to JCPDS PDF number 40-0243.

iii. Impregnation of Platinum

Tetraamine platinum nitrate ($[Pt(NH_3)_4](NO_3)_2$) was used as the platinum precursor. In order to load 2% platinum 0.002 g of $[Pt(NH_3)_4](NO_3)_2$ was weighed and dissolved in minimum amount of water and added to 0.049 g of $InFeO_3(ZnO)_2$, mixed well and dried at 60° C. The mixture was transferred to an alumina crucible and heated at 400° C. for 1 h.

iv. Photocatalytic Activity

The 2% platinum loaded $InFeO_3(ZnO)_2$ was dispersed in 20 ml water and 5 ml methanol by means of a magnetic stirrer in a gas closed irradiation cell made of quartz having 70 ml capacity. Here methanol was taken as sacrificial reagent which gets oxidized by the resulting photogenerated holes. The light source was a 400 W mercury lamp for UV and 400 W Tungsten lamp for visible irradiation. The amount of $H_2$ evolved was determined using gas chromatography (Agilent GC with Carbosphere column and $N_2$ as carrier gas). The reaction was carried out for 1 to 5 hours as tabulated herein. The evolving gas mixture was taken in a syringe at an interval of 1 hour and injected into the GC. The experiments were carried out with bare and platinum loaded catalyst under UV and visible irradiation. With reference to FIGS. 4-7 and Tables 2, 3, 4 and 5 it is observed that $H_2$ evolves in the presence of co catalyst exemplified as Pt, in both UV and visible ranges.

TABLE 2

| Catalyst | Irradiation | Irradiation Time (h) | $H_2$ evolved (μmol/g/h) |
|---|---|---|---|
| $InFeO_3(ZnO)_2$ with Pt | UV | 2 | 233.5063 |
| | | 3 | 199.6466 |
| | | 4 | 174.612 |
| | | 5 | 158.0367 |

TABLE 3

| Catalyst | Irradiation | Irradiation Time (h) | $H_2$ evolved (μmol/g/h) |
|---|---|---|---|
| $InFeO_3(ZnO)_2$ without Pt | UV | 2 | 445.5616 |
| | | 3 | 517.2267 |
| | | 4 | 407.1339 |
| | | 5 | 209.6826 |

TABLE 4

| Catalyst | Irradiation | Irradiation Time (h) | $H_2$ evolved (μmol/g/h) |
|---|---|---|---|
| $InFeO_3(ZnO)_2$ without Pt | Visible | 1 | 1761.588 |
| | | 2 | 1536.928 |
| | | 3 | 1284.246 |
| | | 4 | 1114.3 |

TABLE 5

| Catalyst | Irradiation | Irradiation Time (h) | $H_2$ evolved (μmol/g/h) |
|---|---|---|---|
| $InFeO_3(ZnO)_2$ with Pt | Visible | 1 | 1686.829 |
| | | 2 | 1230.631 |
| | | 3 | 1310.478 |

Example 3 i. Synthesis of $InFeO_3(ZnO)_3$

For 1 g of $InFeO_3(ZnO)_3$ 0.2999 g, 0.1725 g and 0.5275 g of $In_2O_3$, $Fe_2O_3$ and ZnO were weighed respectively and ground thoroughly under acetone in an agate mortar and pestle. The mixed powders were transferred to a platinum crucible and calcined at 700° C., 900° C. and 1000° C. overnight with intermitted grinding in a muffle furnace. The resulting powder was made into pellet by adding 2.5% polyvinyl alcohol in aqueous solution as binder. The pellet was sintered two times at 1350° C. for 15 h.

ii. Characterization of $InFeO_3(ZnO)_3$

X Ray Diffraction

The phase formation was confirmed with XRD. Powder X-ray diffraction (XRD) was carried out in a PANalytical X'pert Pro dual goniometer diffractometer working under 40 kV and 30 mA. The radiation used was Cu Kα (1.5418 Å) with a Ni filter and the data collection was carried out using a flat holder in Bragg-Brentano geometry with 1° slit at the source and receiving sides. An X'celerator solid-state detector with a scan speed of $0.012°$ $min^{-1}$ was employed.

Figure 9:
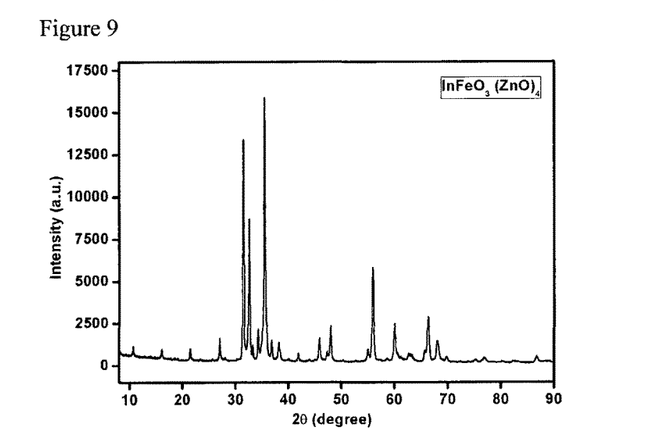
FIG. 9 depicts the effect of irradiation time on hydrogen generation by $InFeO_3$ $(ZnO)_3$ without loading Pt under visible irradiation.
Figure 10:
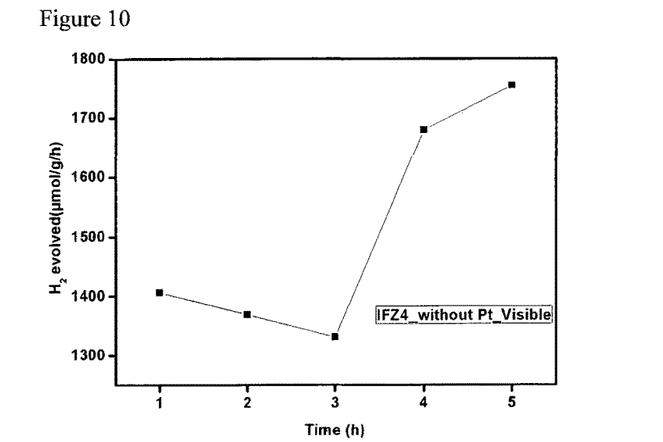
FIG. 10 depicts the powder XRD pattern of $InFeO_3$ $(ZnO)_4$.

The XRD pattern (FIG. 8) matches that of the reported compound corresponding to JCPDS PDF number 40-0244.

iii. Photocatalytic Activity $InFeO_3(ZnO)_3$ was dispersed in 20 ml water and 5 ml methanol by means of a magnetic stirrer in a gas closed irradiation cell made of quartz having 70 ml capacity. Here methanol was taken as sacrificial reagent which gets oxidized by the resulting photogenerated holes. The light source was a 400 Watt tungsten lamp for visible irradiation. The amount of $H_2$ evolved was determined using gas chromatography (Agilent GC with Carbosphere column and $N_2$ as carrier gas). The reaction was carried out for 1 to 6 hours. The evolving gas mixture was taken in a syringe at an interval of 1 hour and injected into the GC. It may be concluded from FIG. 9 and Table 6 that the catalyst of this example evolves $H_2$ up to 1 milli mole even without presence of co catalyst. Further, the catalyst of this example has exhibited stability and activity over 6 hours.

TABLE 6

Water splitting activity of $InFeO_3(ZnO)_3$

| Catalyst | Irradiation | Irradiation Time (h) | $H_2$ evolved (μmol/g/h) |
|---|---|---|---|
| $InFeO_3(ZnO)_3$ without Pt | Visible | 1 | 766.4058 |
| | | 2 | 747.9462 |
| | | 3 | 788.8368 |
| | | 4 | 984.5972 |
| | | 5 | 1052.739 |
| | | 6 | 960.1463 |

Example 4 i. Synthesis of InFeO$_3$(ZnO)$_4$

For 1 g of InFeO$_3$(ZnO)$_4$ 0.2551 g, 0.1467 g and 0.5982 g of In$_2$O$_3$, Fe$_2$O$_3$ and ZnO were weighed respectively and ground thoroughly under acetone in an agate mortar and pestle. The mixed powders were transferred to a platinum crucible and calcined at 700° C., 900° C. and 1000° C. overnight with intermitted grinding in a muffle furnace. The resulting powder was made into pellet by adding 2.5% polyvinyl alcohol in aqueous solution as binder. The pellet was sintered two times at 1350° C. for 15 h.

ii. Characterization of InFeO$_3$(ZnO)$_4$

X Ray Diffraction

The phase formation was confirmed with XRD. Powder X-ray diffraction (XRD) was carried out in a PANalytical X'pert Pro dual goniometer diffractometer working under 40 kV and 30 mA. The radiation used was Cu K$\alpha$ (1.5418 Å) with a Ni filter and the data collection was carried out using a flat holder in Bragg-Brentano geometry with 1° slit at the source and receiving sides. An X'celerator solid-state detector with a scan speed of 0.012° min$^{-1}$ was employed. The XRD pattern (FIG. 10) matches that of the reported compound corresponding to JCPDS PDF number 40-0245.

iii. Photocatalytic Activity

Figure 11:
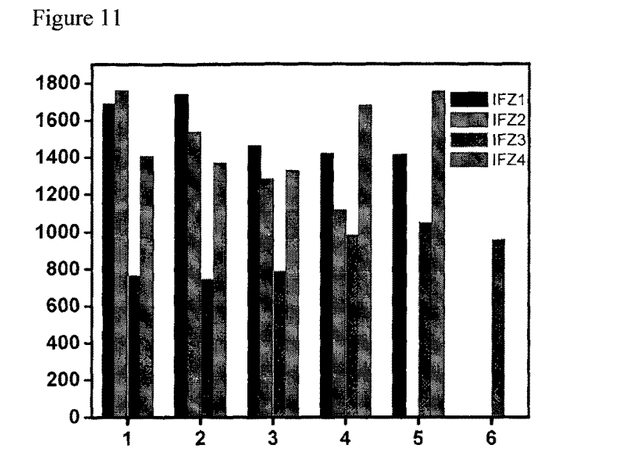
FIG. 11 depicts the effect of irradiation time on hydrogen generation by $InFeO_3(ZnO)_4$ without loading Pt under visible irradiation.
Figure 12:
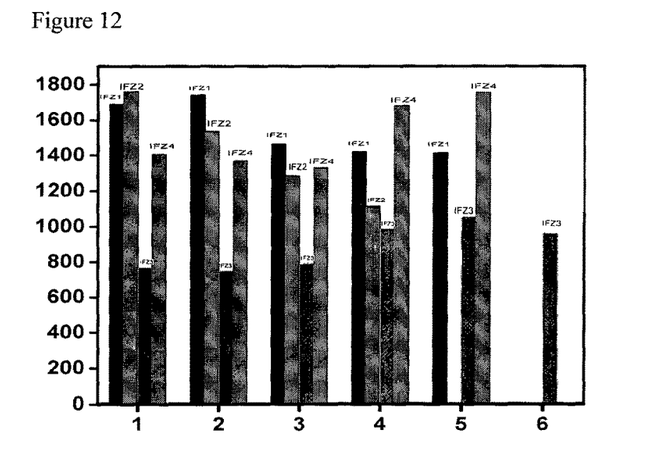
FIG. 12 depicts the comparison of water splitting activity in visible light without Pt impregnation for the three catalysts.

InFeO$_3$(ZnO)$_4$ was dispersed in 20 ml water and 5 ml methanol by means of a magnetic stirrer in a gas closed irradiation cell made of quartz having 70 ml capacity. Here methanol was taken as sacrificial reagent which gets oxidized by the resulting photogenerated holes. The light source was 400 Watt tungsten lamp for visible irradiation. The amount of H$_2$ evolved was determined using gas chromatography (Agilent GC with Carbosphere column and N$_2$ as carrier gas). The reaction was carried out for 5 hours. The evolving gas mixture was taken in a syringe at an interval of 1 hour and injected into the GC. With reference to Table 7 and FIG. 11, H$_2$ evolution is observed to be greater than 1 milli mole for five hours, in the absence of a co catalyst selected from Pt or NiO.

TABLE 7

Water splitting activity of InFeO$_3$(ZnO)$_4$

| Catalyst | Irradiation | Irradiation Time (h) | H$_2$ evolved (μmol/g/h) |
|---|---|---|---|
| InFeO$_3$(ZnO)$_4$_without Pt | Visible | 1 | 1406.202 |
| | | 2 | 1368.77164 |
| | | 3 | 1330.18205 |
| | | 4 | 1679.50397 |
| | | 5 | 1754.50057 |

Example 5

Photocatalytic Water Splitting Activity of InGaO$_3$ZnO

Figure 13:
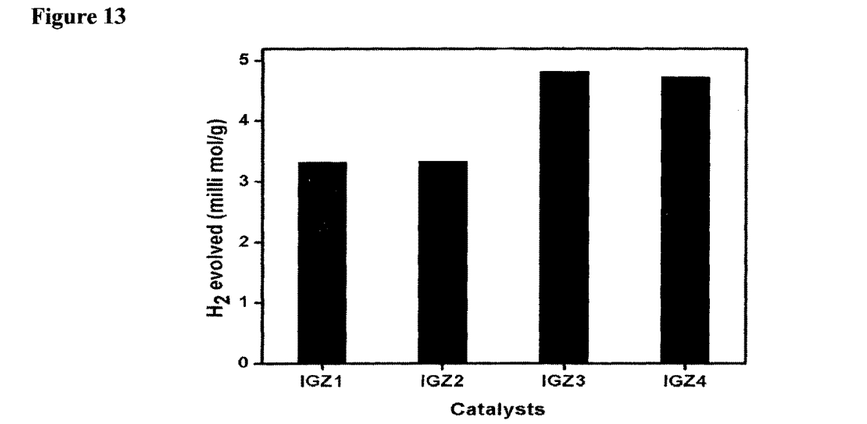
FIG. 13 depicts $H_2$ evolution with IGZ $InGaO_3(ZnO)m$, where m=1-4 catalysts under UV light irradiation.

Photocatalytic water splitting activities for the instant IGZ (InGaO$_3$ZnO) compounds were evaluated with or without a co-catalyst. The results of hydrogen evolved with IGZ catalyst in the absence of a co-catalyst are tabulated in Table 8 and represented graphically in FIG. 13. The experiments were performed for 2 hours under UV light irradiation.

TABLE 8

H$_2$ evolution with IGZ catalysts without co-catalyst under UV light

| Catalysts | H$_2$ evolved (milli mol/g) |
|---|---|
| IGZ1 | 3.31258 |
| IGZ2 | 3.36874 |
| IGZ3 | 4.48085 |
| IGZ4 | 4.72560 |

The H$_2$ evolution experiments using InGaO$_3$ZnO catalysts were performed in presence of visible light irradiation. However, H$_2$ evolution was negligible.

Therefore, co-catalysts such as CuO, NiO in combination with IGZ catalysts were used in order to enhance the water splitting activity in the visible region. 1 wt % and 2 wt % NiO loaded IGZ catalysts were used for water splitting under both UV and visible light irradiations for 4 hours.

Even though these catalysts were shown to be active for water splitting under UV light, it did not indicate any visible light activity. The amount of hydrogen evolved under UV light when using 1 wt % and 2 wt % NiO co-catalyst is tabulated in the Table 9 and also represents graphically in FIG. 14.

TABLE 9

H$_2$ evolution with 1 wt %, 2 wt % NiO loaded IGZ catalyst

| | H$_2$ evolved in 4 h, UV light irradiation | |
|---|---|---|
| Catalysts | 1% NiO | 2% NiO |
| IGZ1 | 5.49722 | 13.57300 |
| IGZ2 | 6.80806 | 14.35979 |
| IGZ3 | 6.14817 | 11.48355 |
| IGZ4 | 8.35684 | 12.55806 |

Figure 14:
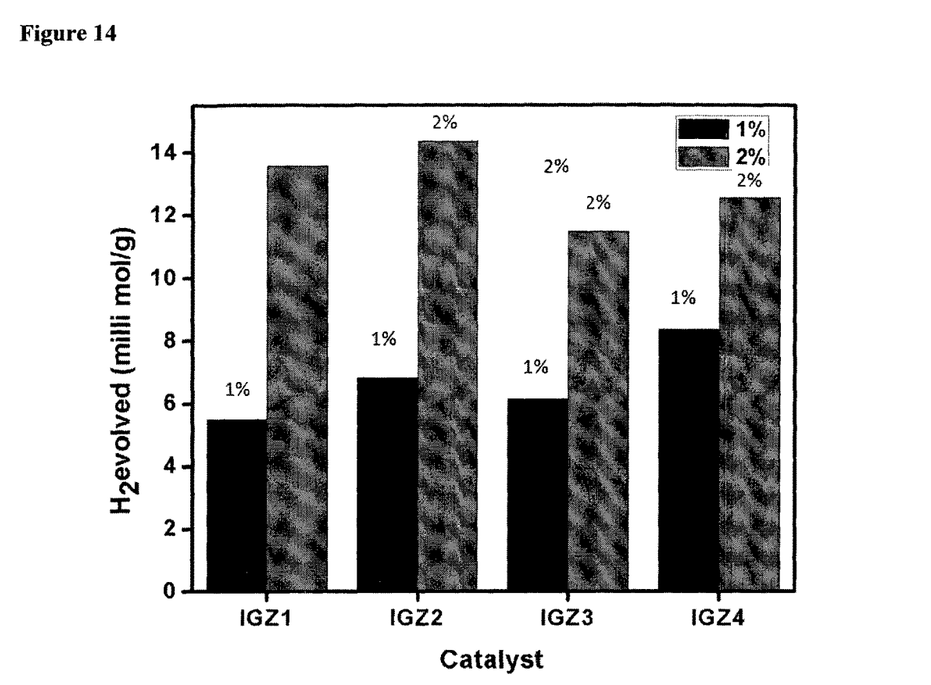
FIG. 14 depicts $H_2$ evolution with 1 wt %, 2 wt % NiO loaded IGZ catalyst.

From FIG. 14, it is observed that NiO co-catalyst functions efficiently for InGaO$_3$(ZnO)$_m$ (m=1-4) series under UV irradiation. 2 wt % NiO loaded IGZ exhibits enhanced activity compared to 1 wt % NiO loaded. This proves the role of co-catalyst in water splitting.

Figure 15:
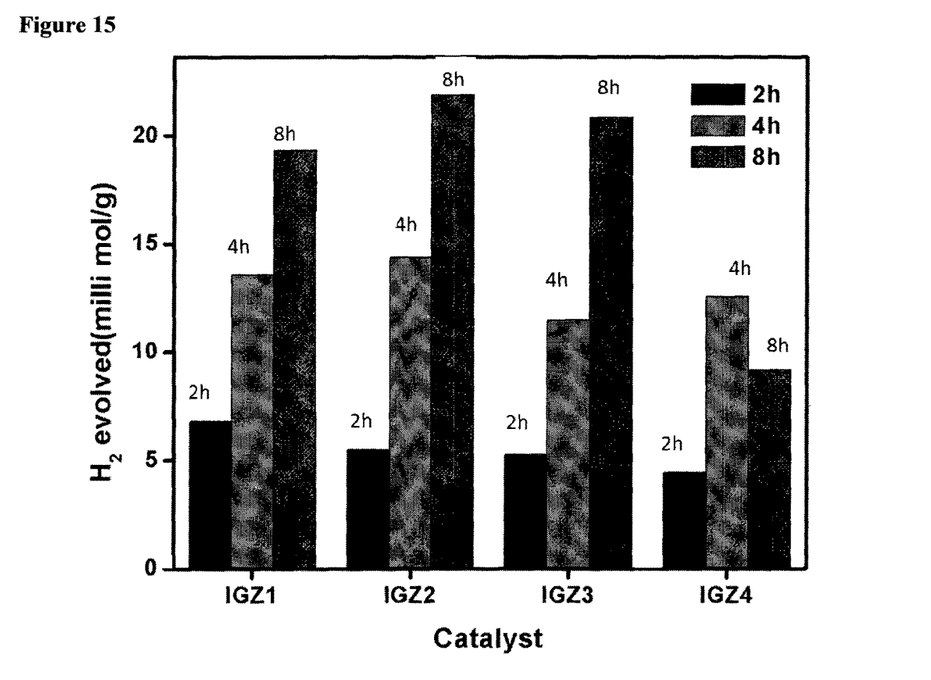
FIG. 15 depicts $H_2$ evolution with 2 wt % NiO loaded IGZ catalysts.

2 wt % NiO loaded IGZ samples were used for detailed study by varying time of light irradiation. The results obtained from these experiments are graphically represented in FIG. 15. From the figure it is observed that as time of irradiation increases, the water splitting activity also increases. The NiO loaded IGZ based photocatalysts work under UV light irradiation.

As known from earlier experiments, IGZ water splitting catalysts were found to be less active under visible light.

In view of the weak activity of IGZ catalyst under visible light, it is necessary to provide a photocatalyst which functions under visible light. Sunlight consists of 50% visible light and only 4% UV light. In order to utilize solar energy efficiently, a photocatalyst which is visible light active for water splitting is more favorable.

It is reported that CuO loaded photocatalysts work efficiently under visible light irradiation. Water splitting experiments with 1 wt %, 2 wt % CuO loaded IGZ catalysts were conducted under visible light irradiation and the results obtained from these experiments are tabulated in Table 10 and graphically represented in FIG. 16.

TABLE 10

H$_2$ evolution with 1 wt %, 2 wt % CuO loaded IGZ catalysts at 4 hours under visible light.

| Catalysts | H$_2$ evolved (milli mol/g) | |
|---|---|---|
| | 1 wt % CuO | 2 wt % CuO |
| IGZ1 | 2.99879 | 5.18061 |
| IGZ2 | 3.62655 | 4.54663 |
| IGZ3 | 2.18242 | 3.23298 |
| IGZ4 | 3.392526 | 3.35715 |

Figure 16:
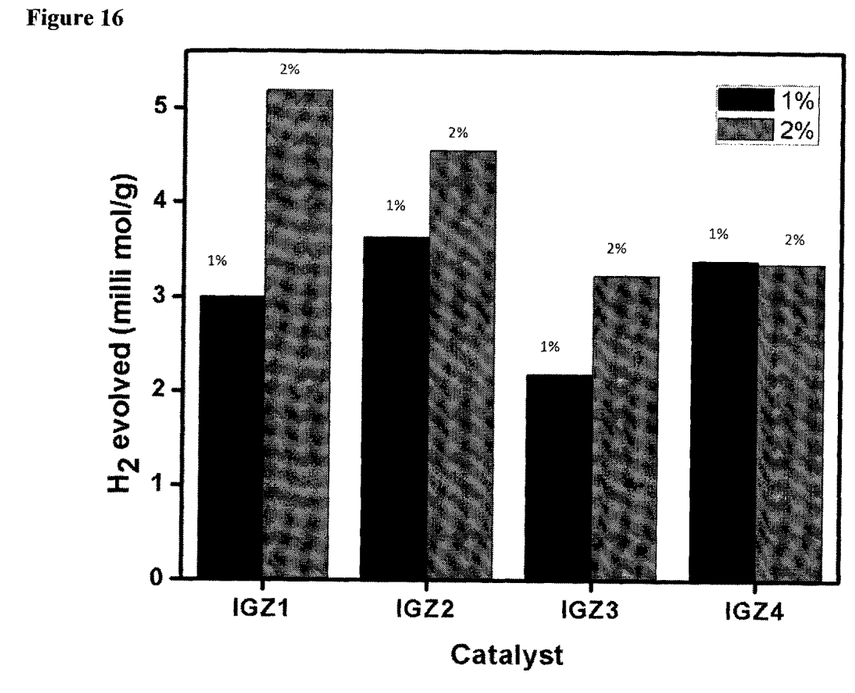
FIG. 16 depicts $H_2$ evolution with 1 wt %, 2 wt % CuO loaded IGZ catalyst at 4 hours.
Figure 17:
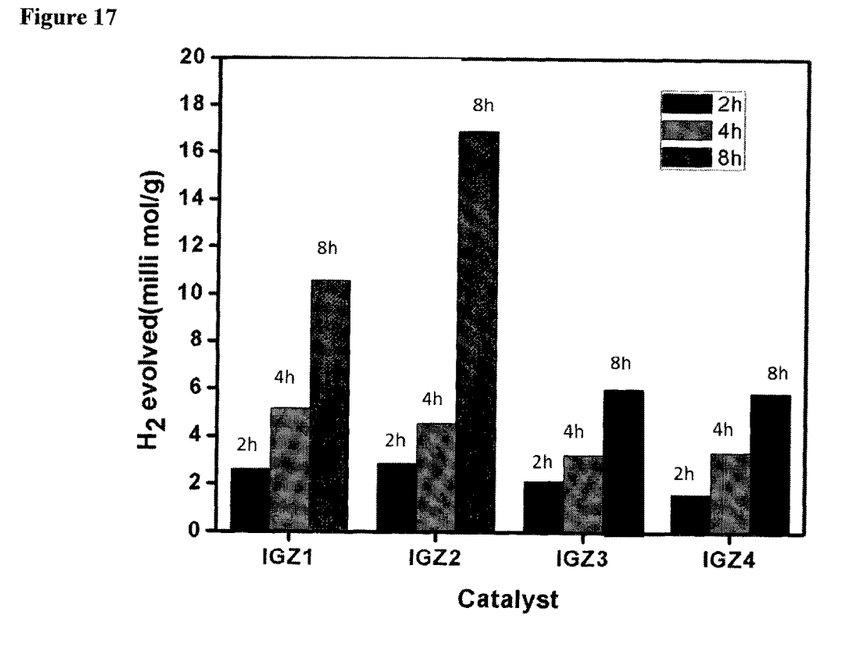
FIG. 17 depicts $H_2$ evolution with 2 wt % CuO loaded IGZ catalysts.

From FIG. 16 it is observed that the 2 wt % CuO loaded IGZ catalysts shows more water splitting activity than the corresponding 1 wt % CuO loaded IGZ catalysts. This proves that the addition of CuO as co-catalyst improves the activity. More experiments were conducted with 2 wt % CuO loaded IGZ catalysts by varying time of visible light irradiation and the results are graphically represented in FIG. 17.

Figure 18:
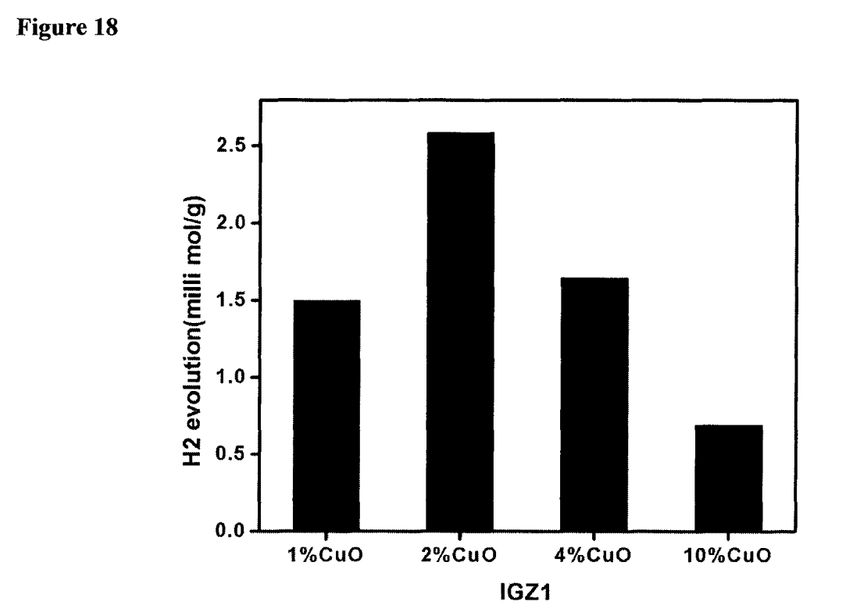
FIG. 18 depicts $H_2$ evolution from IGZ1 with different CuO loading.

It is observed that as time of irradiation increases, H$_2$ production also increases. Experiments were also done by varying the CuO loading in IGZ1 catalyst viz. 1 wt %, 4 wt % and 10 wt % CuO and the results obtained are tabulated in Table 11 and graphically represented in FIG. 18.

TABLE 11

H$_2$ evolution with IGZ1 catalyst with different CuO loading.

| IGZ1 | Amount of H$_2$ evolved (Milli mol/g) under visible light for 2 h |
|---|---|
| 1 wt % CuO | 1.49939 |
| 2 wt % CuO | 2.58468 |
| 4 wt % CuO | 1.645000 |
| 10 wt % CuO | 0.69134 |

Results shown in Table 11, indicate that IGZ1 loaded with 2 wt % CuO exhibits enhanced water splitting activity in visible light irradiation. Increase in loading concentration of CuO results in a decrease in the water splitting activity therefore increase in concentration of metal oxide adversely affects the water splitting activity. Moreover, loading with 2 wt % CuO loaded IGZ catalysts indicates better hydrogen evolution activity.

Advantages of the embodiments of the invention include economical process, since metal oxide co-catalyst is optional; and the photo catalyst is UV and visible active, with more activity in visible, especially in the absence of a co catalyst.

We claim:

1. A photocatalytic water splitting process for H$_2$ generation, the process comprising:
    a) dispersing a catalyst powder having the formula InA(ZnO)$_m$ in a reactant solution to provide a reactant mixture in a gas closed irradiation system, wherein A is FeO$_3$ or GaO$_3$ and m=1-5, and wherein the reactant solution comprises water and methanol in ratio of 4:1; and
    b) irradiating the reactant mixture as obtained in step (a) in the visible light range, in the UV light range, or both the visible and UV light range, to obtain hydrogen;
    wherein the catalyst powder of the reactant mixture irradiated in the visible light range is selected from the group consisting of InFeO$_3$(ZnO)$_m$, InFeO$_3$(ZnO)$_m$ co-catalyzed with Pt, and InGaO$_3$(ZnO)$_m$ co-catalyzed with CuO; and
    wherein the catalyst powder of the reactant mixture irradiated in the UV light range or both the visible light range and the UV light range is selected from the group consisting of InFeO$_3$(ZnO)$_m$, InFeO$_3$(ZnO)$_m$ co-catalyzed with Pt, InGaO$_3$(ZnO)$_m$, InGaO$_3$(ZnO)$_m$ co-catalyzed with NiO, and InGaO$_3$(ZnO)$_m$ co-catalyzed with CuO.

2. The photocatalytic water splitting process according to claim 1, wherein the catalyst powder is InFeO$_3$(ZnO)$_m$.

3. The photocatalytic water splitting process according to claim 2, wherein a hydrogen evolution rate is in the range of 7 to 11 milli mol/g/h and 0.8 to 3.58 milli mol/g/h in the presence of the reactant mixture having InFeO$_3$(ZnO)$_m$ and InGaO$_3$(ZnO)$_m$, respectively.

4. The photocatalytic water splitting process according to claim 1, wherein the irradiation process is carried out in the UV light range.

5. The photocatalytic water splitting process according to claim 1, wherein said process is carried for a period of 1-12 hours.

6. The photocatalytic water splitting process according to claim 1, wherein the catalyst powder of the reactant mixture is InGaO$_3$(ZnO)$_m$ co-catalyzed with NiO, and wherein NiO is loaded onto InGaO$_3$(ZnO)$_m$.

7. The photocatalytic water splitting process according to claim 1, wherein the catalyst powder of the reactant mixture is InGaO$_3$(ZnO)$_m$ co-catalyzed with CuO, and wherein CuO is loaded onto InGaO$_3$(ZnO)$_m$.

8. The photocatalytic water splitting process according to claim 1, wherein the catalyst powder of the reactant mixture is InFeO$_3$(ZnO)$_m$ co-catalyzed with Pt, and wherein Pt is loaded onto InFeO$_3$(ZnO)$_m$.

9. The photocatalytic water splitting process according to claim 1, wherein the irradiation process is carried out in the visible light range.

10. The photocatalytic water splitting process according to claim 1, wherein the irradiation process is carried out in the visible light range and the UV light range.

11. The photocatalytic water splitting process according to claim 1, wherein the catalyst powder of the reactant mixture is InFeO$_3$(ZnO)$_m$ co-catalyzed with Pt.

12. The photocatalytic water splitting process according to claim 1, wherein the catalyst powder of the reactant mixture is InGaO$_3$(ZnO)$_m$ co-catalyzed with CuO.

13. The photocatalytic water splitting process according to claim 1, wherein the catalyst powder of the reactant mixture is InGaO$_3$(ZnO)$_m$.

14. The photocatalytic water splitting process according to claim 1, wherein the catalyst powder of the reactant mixture is InGaO$_3$(ZnO)$_m$ co-catalyzed with NiO.

* * * * *